UNITED STATES PATENT OFFICE 2,458,131

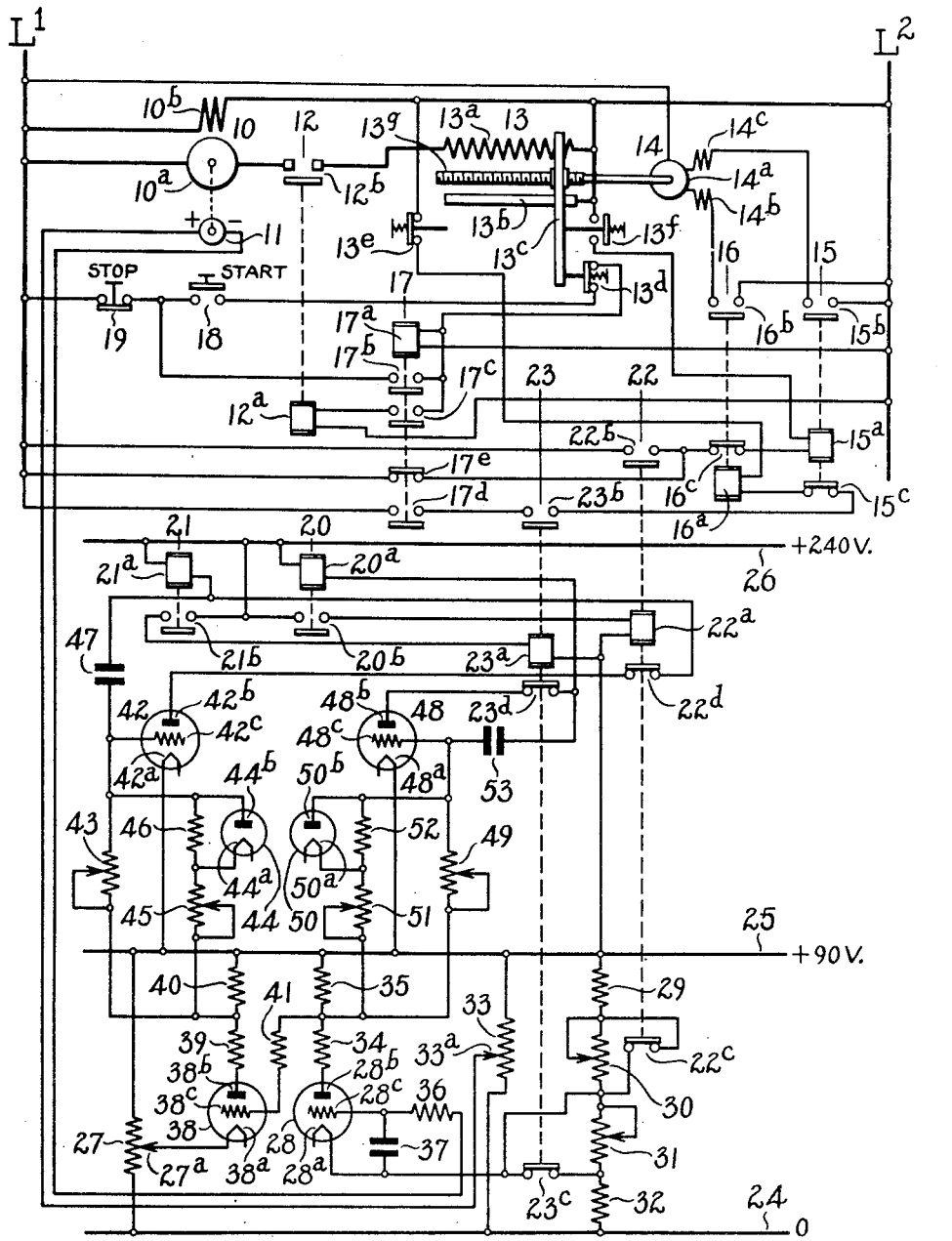

CONTROL OF ENERGY SUPPLIED TO TRANSLATING DEVICES

Mark Audier, Milwaukee, and William H. Elliot, Shorewood, Wis., assignors to Cutler-Hammer, Inc., Milwaukee, Wis., a corporation of Delaware Application October 20, 1945, Serial No. 623,590

8 Claims. (Cl. 318—327)

The invention relates to the control of energy supplied to a translating device in accordance with an operating characteristic of said device and while many uses it is particularly applicable for automatic speed control of electric motors and for automatic control of the energy input of other translating circuits.

The present invention is an improvement in the subject matter disclosed and claimed in Elliot Patent No. 2,428,702, dated October 7, 1947, and assigned to the same assignee.

In accordance with the invention a voltage which is a function of an operating characteristic of the device to be controlled is compared with a reference voltage; the difference between these voltages is impressed upon a system of electronic devices which amplify such difference and in turn supply controlling currents which produce the desired controlling effect upon the device to be controlled.

An object of the invention is to provide for accurate control of an operating characteristic of a translating device.

Another object is to provide a control of the aforementioned type which responds with a controllable time delay to prevent hunting, but without unduly delaying the response.

Another object is to provide a control of the aforementioned type which affords large controlling effects for small departures from the desired condition.

Another object is to provide a rapid control system for the control of dynamo electric machines.

Another object is to provide an automatic speed regulating system for a motor, affording a wide range of accurately maintained speeds.

Another object is to provide an extremely sensitive system for maintaining a motor at a constant desired speed.

Another object is to provide an extremely sensitive system for maintaining constant an operating characteristic of a translating device.

Another object is to provide a control system for maintaining constant a given condition by step by step operation of a correcting effect, whereby the frequency of said steps and their duration may be controlled.

Other objects and advantages will hereinafter appear.

The accompanying diagram is illustrative of an embodiment of the invention in a direct current motor speed control system.

In the drawing, the numeral 10 designates a direct current motor which is to be supplied with direct current energy from the bus bars L¹, L². The motor 10 is provided with an armature 10ᵃ and a separately excited field winding 10ᵇ, which latter is directly connected across the bus bars L¹ and L². It is of course understood that a regulator may be employed for controlling the energization of the field winding 10ᵇ, but as the same is not essential for an explanation of the operation of the invention it has been omitted from the diagram. Connected to the motor shaft is an electric tachometer 11 which may be of any type whose output voltage is directly proportional to the speed of the motor armature. One terminal of the motor armature 10ᵃ is connected to the bus bar L¹, while the second terminal is connected through the normally open main contacts 12ᵇ of an electromagnetic switch 12 to one terminal of a variable resistor 13ᵃ of a resistance commutator 13. The second terminal of the resistor 13ᵃ is connected to line L². Besides the variable resistor 13ᵃ the commutator 13 is provided with a segment 13b and a cross-head 13c which makes contact with the resistor 13ᵃ and the segment 13b. As the segment 13ᵇ is connected to the line L², the cross-head upon being reciprocated short circuits more or less of the resistor 13ᵃ. In the position shown in the diagram all of the resistance of the resistor 13ᵃ is in series with the motor armature and as the cross-head moves toward the left resistance is cut out of the motor circuit until in the extreme left-hand position the resistor 13ᵃ is completely short circuited. The cross-head is further equipped with abutments which actuate the limit switches 13ᵈ, 13ᵉ and 13ᶠ. The limit switch 13ᵈ has normally open contacts which are closed when the cross-head reaches the extreme right-hand position. The limit switch 13ᵉ has normally closed contacts which are opened when the cross-head reaches its extreme left-hand position and the limit switch 13ᶠ has normally closed contacts which are opened when the cross-head reaches its extreme right-hand position. The cross-head 13c is provided with a threaded nut engaging a threaded shaft 13ᵍ, which upon rotation reciprocates the cross-head. The shaft 13ᵍ is driven by a reversing pilot motor 14, having an armature 14ᵃ and reversing windings 14ᵇ and 14ᶜ. One or the other of said reversing windings may be connected in circuit with the armature. When the winding 14ᵇ is in circuit the motor 14 revolves in a direction to move the cross-head to the left, whereas when the winding 14ᶜ is energized the motor 14 operates in the reverse direction to move the cross-head to the right.

Energization of the pilot motor 14 for forward and reverse operations is controlled by relays 15 and 16, respectively. The relay 15 is provided with an energizing winding 15a, normally open contacts 15b, and normally closed contacts 15c, while the relay 16 is provided with an energizing winding 16a, normally open contacts 16b, and normally closed contacts 16c. The system also includes a relay 17 having an energizing winding 17a, normally open contacts 17b, 17c, 17d and normally closed contacts 17e. Operation of the system may be started by depressing a start push button 18 having normally open contacts and may be stopped by depressing a stop push button 19 having normally closed contacts.

Energization of relays 15 and 16 is controlled by relays 20 and 21, respectively, through relays 22 and 23, respectively, the relays 20 and 21 in turn responding to the voltage of the tachometer 11 as will be explained hereinafter. The relays 20 and 21 are each provided with an energizing winding 20a and 21a, respectively, and with normally open contacts 20b and 21b, respectively. The relays 22 and 23 are provided with energizing windings 22a and 23a, respectively, normally open contacts 22b and 23b, respectively, and normally closed contacts 22c, 22d and 23c, 23d, respectively. The energy for operation of the relays 20 and 21, 22 and 23, is supplied by bus bars 24, 25 and 26. The bus bar 24 may be at ground potential, while the potential of the bus bars 25 and 26 with respect to the bus bar 24 is plus 90 volts and plus 240 volts, respectively.

Connected across the bus bars 24 and 25 is a voltage dividing resistor 27, having a movable contact 27a, said resistor being provided for the adjustment of the sensitivity of response of the system as will hereinafter be explained. The system further includes an electronic tube 28, having a cathode 28a, an anode 28b and a control electrode 28c. Connected across the bus bars 24 and 25 and in series relation are a fixed resistor 29, anti-hunting voltage dividing resistors 30 and 31 and a fixed resistor 32. Also connected across the bus bars 24 and 25 is a speed setting voltage dividing resistor 33, having a movable contact 33a. The cathode 28a is connected to the common terminal of the resistors 30 and 31. The anode 28b is connected to the bus bar 25 through series connected resistors 34 and 35, while the control electrode 28c is connected to the negative terminal of the tachometer 11 through a resistor 36 and is also connected to the cathode 28a through a capacitor 37. Connected to the movable contact 27a is the cathode 38a of an electron tube 38. The tube 38 also has an anode 38b and a control electrode 38c. The anode 38b is connected to the bus bar 25 through series connected resistors 39 and 40, while the control electrode 38c is connected to the common terminal of resistors 34 and 35, through a resistor 41.

One terminal of the energizing winding 21a is connected to the bus bar 26, while the other terminal is connected through the normally closed contacts 22d to the anode 42b of an electron tube 42, which has also a cathode 42a connected to the bus bar 25 and a control electrode 42c connected through a variable resistor 43 to the common terminal of the resistors 39 and 40. The control electrode 42c is also connected to the anode 44b of a half wave rectifying tube 44, having a cathode 44a which is connected through an adjustable resistor 45, to the common terminal of the resistors 39 and 40 and is also connected through a resistor 46 to the anode 44b. Interposed between the control electrode 42c and the terminal of the winding 21a removed from the bus bar 26 is a capacitor 47. One terminal of the energizing winding 20a is connected to the bus bar 26 while the other terminal is connected through the normally closed contact 23d to the anode 48b of an electron tube 48 which has a cathode 48a connected to the bus bar 25 and a control electrode 48c which is connected through an adjustable resistor 49 to the common terminal of the resistors 34 and 35. The control electrode 48c is also connected to the anode 50b of a half wave rectifier 50, the cathode 50a of which is connected through an adjustable resistor 51 to the common terminal of the resistors 34 and 35, while a resistor 52 is interposed between the cathode 50a and the anode 50b. A capacitor 53 is interposed between the control electrode 48c and the second terminal of the winding 20a. The positive terminal of the tachometer 11 is connected to the movable contact 33a of the speed setting potentiometer 33 which is connected across the bus bars 24 and 25. Contacts 22c are connected in parallel with the resistor 30, while the contacts 23c are connected in parallel with the resistor 31. A circuit extends from line L¹ through contacts 22b and 16d, through the energizing winding 15a, limit switch 13¹ to line L². A second circuit extends from line L¹ through contacts 17e, to parallel the contacts 22b. A third circuit extends from line L¹ through contacts 17d, 23b, 15c, energizing winding 16a, limit switch 13e to line L².

The operation of the system will now be described, assuming that the elements of the system are in the positions shown in the diagram and that the motor 10 is at rest while the bus bars L¹ and L², and 24, 25 and 26 are energized. If now the operator wishes to start the motor 10, he pushes the starting push button 18, thereby establishing a circuit from line L¹ through the contacts of switches 19 and 18, through limit switch contact 13d, the energizing winding 17a, to line L². Thereupon the relay 17 responds and closes contacts 17b and 17c. Closure of contacts 17b establishes a maintaining circuit for the winding 17a paralleling the contacts 18 and 13d, whereupon the starting button 18 may be released and the relay 17 remains energized. Closure of contacts 17c establishes an additional circuit through contacts 17b, 17c, energizing coil 12a to line L². This actuates switch 12, which thereupon closes its normally open contacts 12b to complete a circuit from line L¹, through the armature 10a, contacts 12b, resistor 13a, the cross-head 13c, to segment 13b to line L³. Thereupon the motor 10 starts with the entire resistor 13a in series with the armature and accelerates to its lowest speed.

The tachometer generator 11 rotates with the motor 10 to generate a voltage which is substantially proportional to the speed of the motor. Let it be assumed that contact 33a of the speed regulating potentiometer 33 is in the position corresponding to the minimum desired speed of the motor. In this position the cathode 28a has a potential which is negative with respect to that of the grid 28c, since the potential of the common terminal of resistors 31 and 32 is less positive than that of contact 33a and at the moment of starting the terminal voltage of the tachometer 11 is zero. The tube 28 therefore conducts sufficient current to create a substantial voltage drop through the resistors 34 and 35 with the result that the grid 38c is sufficiently negative with respect to the cathode 38ª that the tube 38 will be nonconducting. With no current flowing through the resistors 39 and 40, their common terminal and hence grid 42ᶜ will have substantially the potential of bus bar 25. The tube 42 therefore allows sufficient energizing current to flow through the relay coil 21ª to actuate the relay 21, thereby establishing a circuit from bus bar 26 through contacts 21ᵇ, energizing coil 23ª, to bus bar 25. This energizes the relay 23, thereby establishing a circuit from line L¹, through contacts 17ᵈ, contacts 23ᵇ and 15ᶜ, coil 16ª, through limit switch 13ᵉ to line L². Relay 16 is thus energized and closure of contact 16ᵇ completes a circuit from line L¹, through the forward winding 14ᵇ of the motor 14, through contact 16ᵇ to line L². Thereupon the motor 14 rotates to move the cross-head to the left which reduces the resistance of the resistor 13ª in the circuit of the main motor 10ª, causing the latter to accelerate.

The grid 48ᶜ being substantially negative with respect to the potential of the bus bar 25 and hence with respect to the cathode 48ª, due to the current flowing throughout the resistors 34 and 35, the tube 48 passes insufficient current to the relay coil 20ª to actuate the relay 20.

Upon acceleration of the motor 10 the voltage of the tachometer generator 11 increases. This lowers the voltage of the grid 28ᶜ until ultimately the tube 28 becomes less conducting, thereby decreasing the voltage drop through the resistors 34 and 35, which raises the potentials of the grids 38ᶜ and 48ᶜ, thereby increasing the current of tube 38 and decreasing the potential of the grid 42ᶜ which in turn decreases the current in the tube 42 until the current of the relay coil 21 is reduced to a value such that the contacts 21ᵇ are opened, thus deenergizing the relay 23, which in turn deenergizes relay 16 to open the circuit of the pilot motor 14 and stops further reduction of the resistance 13ª.

The preceding description of operation has assumed that the cathode 28ª has a constant potential during the regulating process. If the acceleration took place as just described, it would be found that after the relays 21, 23 and 16 had dropped out, stopping the pilot motor and the advance of cross-head 13ᶜ, the motor 10 would continue to increase in speed to an extent which depended upon the inertia of the driven system. In other words, it would overshoot the speed for which the speed potentiometer was set. Under these circumstances, if the controller is adjusted to a sensitive response, the resulting increased voltage output of the tachometer would cause relays 20, 22 and 15 to become energized and the pilot motor to retard the cross-head. The system might then overshoot in a speed decreasing direction and the accelerating relays be made to operate again.

It is the function of adjustable resistors 30 and 31 with their corresponding shorting contacts 22ᶜ and 23ᶜ to prevent such hunting action. When the relays 22 or 23 respond, they insert their associated resistors 30 and 31 into the circuit by opening the contacts 22ᶜ and 23ᶜ, respectively. Thus, in accelerating from rest, relay 23 being energized opens contact 23ᶜ. This causes an elevation in the potential of cathode 28ª so that as the potential of the grid 28ᶜ falls under the influence of the increasing voltage output of the tachometer, the current through tube 28 starts to cut off at a lower motor speed than would be the case if the anti-hunting resistor 31 were not inserted with the result that further reduction of the resistor 13ª will be terminated more quickly and overshooting will be prevented or at least diminished.

It will be seen that when relay 23 drops out, contacts 23ᶜ again close, and the original potential is restored to cathode 28ª. If the motor 10 has not quite reached the preset speed by this time, the accelerating relays will again be energized and cause further reduction of resistor 13ª to increase the motor speed. Upon decelerating from a higher speed to a preset lower speed, an equivalent action takes place by the operation of relay 22 to open contacts 22ᶜ and cause the potential of cathode 28ª to be lowered, so that the increase of resistor 13ª is terminated more quickly. By adjusting the resistors 30 and 31, the amount of variation of the potential of the cathode 28 incident to insertion of such resistors can be adjusted independently for the forward and reverse direction of rotation of the motor 14 and without affecting the speed setting potential of contact 33ª.

By connecting the control electrodes 42ᶜ and 48ᶜ to a point intermediate of the resistors 39, 40 and 34, 35, respectively, instead of directly to the anodes 38ᵇ and 28ᵇ, respectively, as in the aforementioned copending application, it is possible to operate the tubes 42 and 48 in a more favorable region of their operating range. It will further be noted that the change of the potential of the control electrodes 42ᶜ and 48ᶜ, respectively, does not follow instantaneously the change of the potential of the anodes 38ᵇ and 28ᵇ, respectively, but is delayed by the charging of the condensers 47 and 53, respectively, as any change of the potential of the anodes 38ᵇ and 28ᵇ must provide a corresponding change of the potential of the aforementioned condensers before such change can take full effect upon the respective grids. This time delay may be adjusted by adjustment of the resistors 43 and 49, respectively, which regulate the rate at which the respective condensers charge.

In general, it is desirable that the change in current conduction of the tubes 42 and 48 and the resulting delay in response to the relays 21 and 20, respectively, be delayed for an appreciable time interval upon energization of the relays but be delayed only slightly upon deenergization during response of the relays to the aforedescribed operation of the anti-hunting resistors 30 and 31. This effect is obtained by the insertion of the rectifying tubes 44 and 50. Upon increase of the potential of the anodes 38ᵇ and 28ᵇ, respectively, the resulting discharging current for the condensers 47 and 53, respectively, cannot flow through the rectifiers, but must pass through the impedance of the resistors 43 and 49, respectively. Thus the deenergization of the relays 21 and 20 is effected at a more rapid rate than their energization, the rate of deenergization being adjustable through the resistors 45 and 51, respectively.

Due to the Edison effect the anodes of the tubes 44 and 50 become negative with respect to their respective cathodes when as in the present case they are inserted in a high impedance circuit. This would affect the circuit sensitivity adversely. However, by providing the parallel resistors 46 and 52, respectively, the current due to the Edison effect is shunted through said resistors rather than through the resistors 43 and 49, respectively, and its effect upon the response of the system is thus diminished.

It is thus evident that instead of maintaining continuous energization of the motor 14 until the correct position of the cross-head is obtained, by the use of the above described anti-hunting circuits the resistor 13ᵃ which controls the speed of the motor 10 is inserted in a step by step fashion until the motor 10 attains the speed corresponding to the setting of the potentiometer 33. The point at which the stepping action commences in the accelerating direction is a function of the value of resistor 31, and the corresponding point in the decelerating direction is a function of the value of resistor 30. It is characteristic of this system that as the cross-head approaches the correct position, the period between successive steps lengthens. This is a very desirable feature. Proper adjustment of the above described elements of the anti-hunting circuit makes it possible to entirely eliminate or allow a controlled amount of overshooting in either the accelerating or decelerating direction of loads varying widely in inertia.

The sensitivity of the system may be adjusted by adjustment of the contact 27ᵃ. This varies the potential of the cathode 38ᵃ with respect to the control electrode 38ᶜ in such a manner that a limited increase of the positive potential of the cathode increases the sensitivity of response to changes of the voltage of the tachometer 11, while a decrease of the potential of the cathode 38ᵃ has the reverse effect. The speed of operation of the motor 10 may be varied by adjustment of the potentiometer contact 33ᵃ, as will be apparent from the foregoing description.

We claim:

1. In a controller, in combination, a translating device subject to varying operating conditions, a source of electrical energy, means to produce a voltage varying in accordance with an operating characteristic of said device, a first and a second electron tube each having a cathode, an anode and a control electrode and having their main discharge paths connected in series with each other and to said source, means to impress an effect of said voltage upon the control electrode of said first tube, an adjustable resistor between the anode of said first and said control electrode of said second tube tending to impress upon said control electrode a potential which varies with the current of said first tube, an adjustable unidirectional conducting path connected in parallel with said adjustable resistor for modifying the effect of the latter in response to the rate of and the direction of change of said potential, and electroresponsive means connected to said device and responsive to the current of said second tube to afford control of said device in accordance with said variations of said operating characteristic.

2. In a controller, in combination, a translating device subject to varying operating conditions, a source of electrical energy, means to produce a voltage varying in accordance with an operating characteristic of said device, a first and a second electron tube each having a cathode, an anode and a control electrode and having their main discharge paths connected in series with each other and to said source, means to impress an effect of said voltage upon the control electrode of said first tube, means to vary the ratio between said voltage and said effect, an adjustable resistor between the anode of said first and said control electrode of said second tube tending to impress upon said control electrode a potential which varies with the current of said first tube, an adjustable unidirectional conducting path connected in parallel with said adjustable resistor for modifying the effect of the latter in response to the rate of and the direction of change of said potential, and electroresponsive means connected to said device and responsive to the current of said second tube to afford control of said device in accordance with said variations of said operating characteristic.

3. In a controller, in combination, a translating device subject to varying operating conditions, a source of electrical energy, means to produce a voltage varying in accordance with an operating characteristic of said device, a first and a second electron tube each having a cathode, an anode and a control electrode and having their main discharge paths connected in series with each other to said source, means to impress an effect of said voltage upon the control electrode of said first tube, an adjustable resistor between the anode of said first and said control electrode of said second tube tending to impress upon said control electrode a potential which varies with the current of said first tube, an adjustable unidirectional conducting path connected in parallel with said adjustable resistor for modifying the effect of said resistor in response to the rate of and the direction of change of said potential, a condenser connected between said control electrode of said second tube and said source to afford different degrees of time delay for increases and decreases, respectively, of said last named potential, and electroresponsive means connected to said translating device and responsive to the current of said second tube to afford control of said device in accordance with said variations of said operating characteristic.

4. In a controller, in combination, a translating device subject to varying operating conditions, a source of electrical energy, means to produce a voltage varying in accordance with an operating characteristic of said device, four electron tubes each having a cathode, an anode and a control electrode, said first and second tube and said third and fourth tube, respectively, having their main discharge paths connected in series with each other to said source, means to impress an effect of said voltage upon the control electrode of the first of said tubes, means to impress a voltage which is a function of the current of said first tube upon the control electrode of the third of said tubes, an individual adjustable resistor between the anode of said first and the control electrode of the second and between the anode of the third and the control electrode of the fourth of said tubes, respectively, tending to impress upon the respective control electrodes a potential which varies with the current of said first and third tube, respectively, an individual adjustable unidirectional conducting path connected in parallel with each of said resistors for modifying the effect of the latter in response to the rate of and direction of change of the potential impresssed upon the respective control electrode, an individual condenser connected between the control electrode of said second and of said fourth tubes and said source, respectively, to afford different degrees of time delay for increases and decreases, respectively, of said last named potentials, respectively, and electroresponsive means connected to said translating device and responsive to the currents of said second and fourth tubes to afford control of said device in accordance with said variations of said operating characteristic.

5. In a controller, in combination, a translating device subject to varying operating conditions, a source of electrical energy, means to produce a voltage varying in accordance with an operating characteristic of said device, four electron tubes each having a cathode, an anode and a control electrode, said first and second tube and said third and fourth tube, respectively, having their main discharge paths connected in series with each other to said source, means to impress an effect of said voltage upon the control electrode of the first of said tubes, means to impress a voltage which is a function of the current of said first tube upon the control electrode of the third of said tubes, an individual adjustable resistor between the anode of said first and the control electrode of the second and between the anode of the third and the control electrode of the fourth of said tubes, respectively, tending to impress upon the respective control electrode a potential which varies with the current of said first and third tube, respectively, an individual adjustable unidirectional conducting path connected in parallel with each of said resistors for modifying the effect of the latter in response to the rate of and direction of change of the potential impressed upon the respective control electrode, an individual condenser connected between the control electrode of said second and of said fourth tubes and said source, respectively, to afford different degrees of time delay for increases and decreases, respectively, of said last named potentials, respectively, electroresponsive means connected to said translating device and responsive to the currents of said second and fourth tubes to afford control of said device in accordance with said variations of said operating characteristic, and means responsive to the operation of said electroresponsive means to vary the potential of the cathode of said first tube to decrease the effect of potential variations of the control electrode thereof during response of said electroresponsive means.

6. In a motor controller, in combination, a motor subject to varying operating conditions, means to produce a voltage varying in accordance with an operating characteristic of said motor, four electron tubes each having a cathode, an anode and a control electrode, said first and second tube and said third and fourth tube, respectively, having their main discharge paths connected in series with each other to said source, means to impress an effect of said voltage upon the control electrode of the first of said tubes and including means to vary the ratio between said voltage and said effect, means to impress a voltage which is a function of the current of said first tube upon the control electrode of the third of said tubes, an individual adjustable resistor between the anode of said first and the control electrode of the second and between the anode of the third and the control electrode of the fourth of said tubes, respectively, tending to impress upon the respective control electrode a potential which varies with the current of said first and third tube, respectively, an individual adjustable unidirectional conducting path connected in parallel with each of said resistors for modifying the effect of the latter in response to the rate of and direction of change of the potential impressed upon the respective control electrode, an individual condenser connected between the control electrode of said second and of said fourth tube and said source, respectively, to afford different degrees of time delay for increases and decreases, respectively, of said last named potentials, respectively, and electroresponsive means connected to said motor and responsive to the currents of said second and fourth tubes, to afford control of said motor in accordance with said variations of said operating characteristic.

7. In a motor controller, in combination, a motor, reversible means operative to control an operating characteristic of said motor, a source of electrical energy, means connected to said motor and affording a voltage varying in accordance with said characteristic, four electron tubes each having a cathode, an anode and a control electrode, said first and second tube and said third and fourth tube, respectively, having their main discharge paths connected in series with each other to said source, means to impress an effect of said voltage upon the control electrode of the first of said tubes and including means to vary the ratio between said voltage and said effect, means to impress a voltage which is a function of the current of said first tube upon the control electrode of the third of said tubes, an individual adjustable resistor between the anode of said first and the control electrode of the second and between the anode of the third and the control electrode of the fourth of said tubes, respectively, tending to impress upon the respective control electrode a potential which varies with the current of said first and third tube, respectively, an individual adjustable unidirectional conducting path connected in parallel with each of said resistors for modifying the effect of the latter in response to the rate of and direction of change of the potential impressed upon the respective control electrode, an individual condenser connected between the control electrode of said second and of said fourth tube and said source, respectively, to afford different degrees of time delay for increases and decreases, respectively, of said last named potentials respectively, and electroresponsive means connected to said reversible means and responsive to the currents of said second and fourth tubes, to afford control of said reversible means in accordance with variations of said operating characteristic.

8. In a motor controller, in combination, a motor, reversible means operative to control an operating characteristic of said motor, a source of electrical energy, means connected to said motor and affording a voltage varying in accordance with said characteristic, four electron tubes each having a cathode, an anode and a control electrode, said first and second tube and said third and fourth tube, respectively, having their main discharge paths connected in series with each other to said source, means to impress an effect of said voltage upon the control electrode of the first of said tubes and including means to vary the ratio between said voltage and said effect, means to impress a voltage which is a function of the current of said first tube upon the control electrode of the third of said tubes, an individual adustable resistor between the anode of said first and the control electrode of the second and between the anode of the third and the control electrode of the fourth of said tubes, respectively, tending to impress upon the respective control electrode a potential which varies with the current of said first and third tube, respectively, an individual adjustable unidirectional conducting path connected in parallel with each of said resistors for modifying the rate of and direction of change of the potential impressed upon the respective control electrode, an individual condenser connected between the control electrode of said second and of said fourth tube and said source, respectively, to afford different degrees of time delay for increases and decreases, respectively, of said last named potentials, respectively, electroresponsive means connected to said reversible means and responsive to the currents of said second and fourth tubes, to afford control of said reversible means in accordance with variations of said operating characteristic, and means responsive to the operation of said electroresponsive means to vary the potential of the cathode of said first tube to decrease the effect of potential variations of the control electrode thereof during response of said electroresponsive means.

MARK AUDIER.
WILLIAM H. ELLIOT.

REFERENCES CITED

The following references are of record in the file of this patent:

UNITED STATES PATENTS

| Number | Name | Date |
|---|---|---|
| 2,020,961 | Quarles | Nov. 12, 1935 |
| 2,278,212 | Moyer | Mar. 31, 1942 |
| 2,303,110 | Cokrell | Nov. 24, 1942 |

FOREIGN PATENTS

| Number | Country | Date |
|---|---|---|
| 285,482 | Great Britain | July 5, 1928 |
| 446,848 | Great Britain | Jan. 13, 1936 |